(12) United States Patent
Daxer et al.

(10) Patent No.: US 7,936,809 B2
(45) Date of Patent: May 3, 2011

(54) ECONOMICAL, SCALABLE TRANSCEIVER JITTER TEST

(75) Inventors: Kenneth T. Daxer, Sunnyvale, CA (US); Sergey Shumarayev, San Leandro, CA (US)

(73) Assignee: Altera Corporation, San Jose, CA (US)

( * ) Notice: Subject to any disclaimer, the term of this patent is extended or adjusted under 35 U.S.C. 154(b) by 971 days.

(21) Appl. No.: 11/484,986

(22) Filed: Jul. 11, 2006

(65) Prior Publication Data

US 2008/0013609 A1 Jan. 17, 2008

(51) Int. Cl.
*H04L 5/16* (2006.01)

(52) U.S. Cl. ........ 375/221; 375/226; 375/224; 375/219; 375/228

(58) Field of Classification Search .................. 375/226, 375/224, 228, 219, 221
See application file for complete search history.

(56) References Cited

U.S. PATENT DOCUMENTS

| | | | |
|---|---|---|---|
| 5,835,501 A * | 11/1998 | Dalmia et al. | 714/704 |
| 6,331,999 B1 | 12/2001 | Ducaroir et al. | |
| 7,477,875 B2 * | 1/2009 | Zhang et al. | 455/67.11 |
| 2003/0156673 A1 * | 8/2003 | Yanai | 375/371 |
| 2005/0156586 A1 * | 7/2005 | Kanbayashi | 324/76.53 |
| 2005/0172181 A1 * | 8/2005 | Huliehel | 714/724 |
| 2005/0193290 A1 * | 9/2005 | Cho et al. | 714/710 |
| 2006/0184332 A1 * | 8/2006 | Ishida et al. | 702/69 |
| 2007/0061658 A1 * | 3/2007 | Hsu et al. | 714/742 |

* cited by examiner

*Primary Examiner* — Chieh M Fan
*Assistant Examiner* — Siu M Lee
(74) *Attorney, Agent, or Firm* — Weaver Austin Villeneuve & Sampson LLP

(57) ABSTRACT

Any number of transceiver channels is tested for jitter generation/tolerance simultaneously. Tested channels use a serial loopback path to connect a transceiver transmit channel to a transceiver receiver channel. Both the transmitter and receiver PLLs are connected to a common reference clock. The reference clock is modulated with jitter at a frequency below the bandwidth of the transmitter PLL but above the bandwidth of the receiver PLL. The magnitude of eye closure (in an eye diagram), which is equivalent to the amplitude of the jitter, is used to filter out bad transceiver units.

19 Claims, 10 Drawing Sheets

ECONOMICAL, SCALABLE TRANSCEIVER JITTER TEST

BACKGROUND OF THE INVENTION

1. Field of the Invention

The present invention relates to transceivers, and more particularly, to the testing of transceivers.

2. Description of Related Art

Many standards and protocols are now using a high-speed transceiver as part of their physical interface. The protocols cover a spectrum of applications including communications, computer, industrial and storage applications, where there is a need to move large quantities of data between chips or across backplanes, but where traditional parallel bus interfaces can no longer be relied upon.

Conventional techniques for testing a transceiver include utilizing a serial loopback. For instance, Ducaroir et al., U.S. Pat. No. 6,331,999, describes a test method utilizing a serial loopback, which is hereby incorporated by reference for all purposes. Although the serial loopback test is cost effective and can scale to match different transceiver data rates, it does not fully account for the jitter of the link. As such, a non-compliant link can still pass a standard serial loopback test. Even though there are other conventional techniques available for testing a transceiver, they utilize large and expensive test platforms.

Thus, there is a need for improved techniques and mechanisms that allow for an economical and scalable transceiver jitter test.

SUMMARY OF THE INVENTION

The present invention provides techniques and mechanisms for testing transceivers. Aspects of the invention allow any number of transceiver channels to be tested for jitter generation/tolerance simultaneously. Tested channels use a serial loopback path to connect a transceiver transmit channel to a transceiver receiver channel. According to one embodiment, both the transmitter and receiver PLLs (phase-locked loop) are connected to a common reference clock. The reference clock is modulated with jitter at a frequency below the bandwidth of the transmitter PLL but above the bandwidth of the receiver PLL. The magnitude of eye closure, which is equivalent to the amplitude of the jitter, is used to filter out transceiver units that do not meet specification.

In one aspect, the present invention provides a method for testing a transceiver, which has a transmitter and a receiver. A loopback circuit is provided between the transmitter and the receiver. The transmitter and receiver have associated bandwidths and reference clocks with corresponding frequencies. The bandwidth of the transmitter is adjusted to be greater than the bandwidth of the receiver. At least one of the reference clocks is modulated with jitter until a bit error associated with test data is detected after sending the test data through the transceiver. Finally, whether the jitter at which the bit error is detected meets an allowable jitter reference for the transceiver is determined.

In another aspect, the present invention provides an integrated circuit for testing a transceiver having a transmitter and a receiver. The integrated circuit includes a pattern generator, a pattern verifier, and a test controller. The pattern generator is operable to output test data for sending through the transceiver. The pattern verifier is operable to receive test data sent through the transceiver. The test controller is operable to verify that a serial loopback circuit exists between the transmitter and the receiver, adjust a bandwidth of the transmitter to be greater than a bandwidth of the receiver, modulate at least one of a plurality of transceiver reference clocks with jitter until a bit error associated with the test data is detected, and determine whether the jitter at which the bit error is detected meets an allowable jitter reference.

In another aspect, the present invention provides a method for testing a transceiver, which has a transmitter and a receiver. A loopback circuit is established between the transmitter and the receiver. The transmitter and receiver have associated bandwidths and reference clocks with corresponding frequencies. The bandwidth of the transmitter is adjusted to be greater than the bandwidth of the receiver. Jitter is inserted into at least one of the reference clocks. The jitter has a corresponding frequency and amplitude. The jitter frequency is set between the bandwidths of the transmitter and the receiver. Test data is sent through the transceiver. The jitter amplitude is adjusted until a bit error associated with the test data is detected. Finally, whether the jitter at which the bit error is detected meets an allowable jitter reference for the transceiver is determined.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Figure 1:
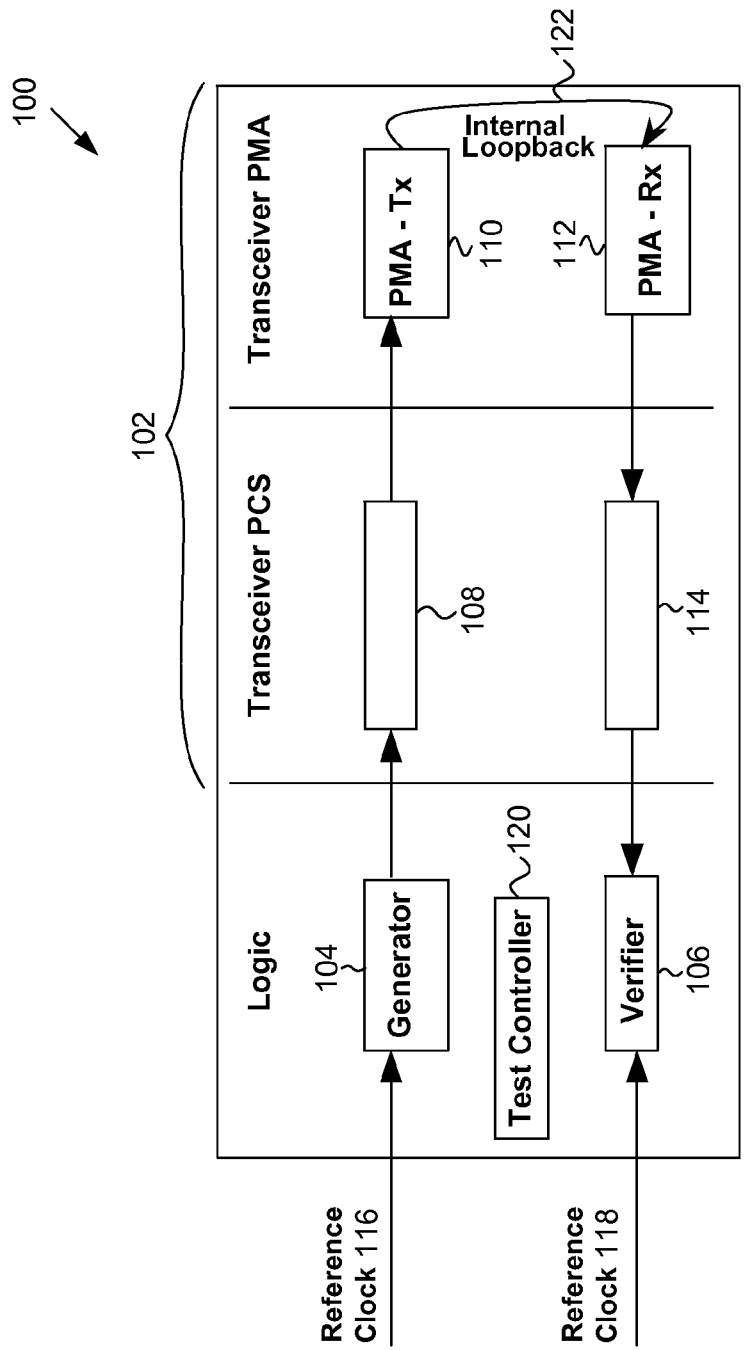
FIG. 1 illustrates a block diagram of a system for testing a transceiver according to various embodiments of the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

However, it should be noted that the techniques of the present invention can be applied to a variety of types of devices. In the following description, numerous specific details are set forth in order to provide a thorough understanding of the present invention. The present invention may be practiced without some or all of these specific details. In other instances, well known process operations have not been described in detail in order not to unnecessarily obscure the present invention. Furthermore, techniques and mechanisms of the present invention will sometimes be described in singular form for clarity. However, it should be noted that some embodiments can include multiple iterations of a technique or multiple instantiations of a mechanism unless noted otherwise.

Overview

The present invention provides techniques and mechanisms for testing transceivers. Aspects of the invention allow any number of transceiver channels to be tested for jitter generation/tolerance simultaneously. Tested channels use a serial loopback path to connect a transceiver transmit channel to a transceiver receiver channel. According to one embodiment, both the transmitter and receiver PLLs are connected to a common reference clock. The reference clock is modulated with jitter at a frequency below the bandwidth of the transmitter PLL but above the bandwidth of the receiver PLL. The magnitude of eye closure, which is equivalent to the amplitude of the jitter, is used to filter out transceiver units that do not meet specification.

The Internet revolution has led to a massive increase in data traffic. The need to support high bandwidth traffic has required that equipment performance grow at an exponential rate. System performance has also increased to support this infrastructure. Backplane and chip-to-chip interfaces supporting multiple serial lines of data are replacing parallel bus implementations in many applications. For example, the 10 Gigabit Ethernet XAUI protocol is becoming increasingly popular in backplane applications, where four aligned channels of 3.125 Gbps collectively provide a backplane data rate of 10 Gbps.

Increases in performance have led semiconductor vendors to develop products capable of handling data rates in excess of 40 Gbps. This in turn has caused a continued evolution from single-ended I/O to differential signaling and the use of serialization and embedded clock recovery. Some of the latest deployed systems use transceivers capable of supporting I/O speeds up to 3.125 Gbps. At these speeds, the transceiver must include more efficient clocking circuitry employing encoding/decoding, clock rate matching, and alignment techniques to ensure accurate transmission of data through multiple media.

An achievable bit error rate (BER) largely depends on the quality of the transmitted data. Two major influences on data quality are the deterministic jitter components and the random jitter components. The deterministic jitter is typically data pattern dependant jitter, attributed to a unique source. Sources are generally related to imperfections in the behavior of a device or transmission media but may also be due to power supply noise, cross-talk, or signal modulation. Random jitter is typically seen at the near end of the link (at the transmitter) and is primarily associated with the transmitter PLL.

Any variation of a signal with respect to its ideal position in time is herein referred to as jitter. This deviation in a clock's output transition from its ideal position can negatively impact data transmission quality. In many cases, other signal deviations, like signal skew and coupled noise are combined and labeled as jitter. Deviation (expressed in ±ps) can occur on either the leading edge or the trailing edge of a signal. Jitter may be induced and coupled onto a clock signal from several different sources and is not uniform over all frequencies. Excessive jitter can increase the BER of a communications signal by incorrectly transmitting a data bit stream. In digital systems, jitter can lead to a violation of timing margins, causing circuits to behave improperly. Accurate measurement of jitter is necessary for ensuring the reliability of a system.

Accordingly, aspects of the present invention allow for accurately and economically testing jitter on both transmit and receive transceiver channels. It will be appreciated by those skilled in the art that the present invention presents many advantages. For example, the present invention can leverage off of conventional techniques and mechanisms for testing transceivers thereby minimizing the impact to design for test (DFT) costs. Also, the present invention can scale to faster/slower data rates. For instance, the present invention allows the ability to scale tests as data rates for transceivers continue to increase. For other examples, the present invention provides a low cost and a very fast test time for testing transceivers. As such, improved transceiver quality can be realized.

Mechanisms for Testing a Transceiver

FIG. 1 illustrates a block diagram of a system 100 for testing a transceiver 102 according to various embodiments of the present invention. Any suitable transceiver may be tested. For example, a high-speed serial transceiver such as the Stratix II GX transceiver available from Altera Corporation, San Jose, Calif., may be tested. Generally, transceiver 102 includes a transmitter (Tx) and a receiver (Rx). According to one embodiment, transceiver 102 includes a digital transmitter portion PCS (Physical Coding Sublayer) 108, an analog transmitter portion PMA (Physical Media Attachment Layer) 110, a digital receiver portion PCS 114, and an analog receiver portion PMA 112.

System 100 includes a pattern generator 104, a pattern verifier 106, a loopback circuit 122, and a test controller 120. Pattern generator 104 is operable to output test data for sending through transceiver 102. Pattern verifier 106 is operable to receive test data sent through transceiver 102. Both pattern generator 104 and pattern verifier 106 are operable to receive reference clocks 116 and 118 respectively. Reference clocks 116 and 118 can either be set at a particular frequency or at different frequencies. A purpose of reference clocks 116 and 118 is for generating and verifying the test data.

In general, loopback circuit 122 allows data to directly transfer between the transmitter and the receiver. The loopback circuit can be either internal or external to the transceiver. At one end of the loopback circuit, connections are made to the output(s) of the transmitter. At the opposite end of the loopback circuit, connections are made to corresponding input(s) of the receiver. For example, loopback circuit 122 can connect a transceiver transmit channel to a transceiver receiver channel.

System 100 also includes a test controller 120 operable to coordinate the testing of transceiver 102 in accordance to various aspects of the present invention. Test controller 120 may include a processor and/or memory. Test controller 120 or any of its components is operable to establish and verify the connections of the serial loopback circuit 122, adjust the bandwidth of the transmitter to be greater than the bandwidth of the receiver, modulate at least one of the transceiver's reference clocks with jitter until a bit error associated with test data is detected after sending the test data through the transceiver, and determine whether the jitter at which the bit error is detected meets an allowable jitter reference (e.g., XAUI jitter specification) for the transceiver.

Any test data suitable for the application may be used. For example, test data may either be continuous or intermittent streams/bits/pulses of information. Further, test data may include pseudo-random binary sequence (PRBS), incremental, high-frequency, low-frequency, or mixed-frequency patterns. Test data may also be transformed into various formats. For example, test data may be transformed from multiple streams of data (i.e., parallel data) into a single stream of data (i.e., serial data) and vice versa.

According to one embodiment, system 100 can be implemented as part of a built-in self-test unit. For instance, transceiver 102, pattern generator 104, pattern verifier 106, and test controller 120 can all be implemented on a single chip; thereby allowing a user to easily test the transceiver. Alternatively, components of system 100 can be implemented separate from each other as individual stand-alone units. For instance, transceiver 102, pattern generator 104, pattern verifier 106, and test controller 120 can each be implemented on separate chips. It will be appreciated by those skilled in the art that system 100 can be implemented in a variety of configurations.

Figure 2:
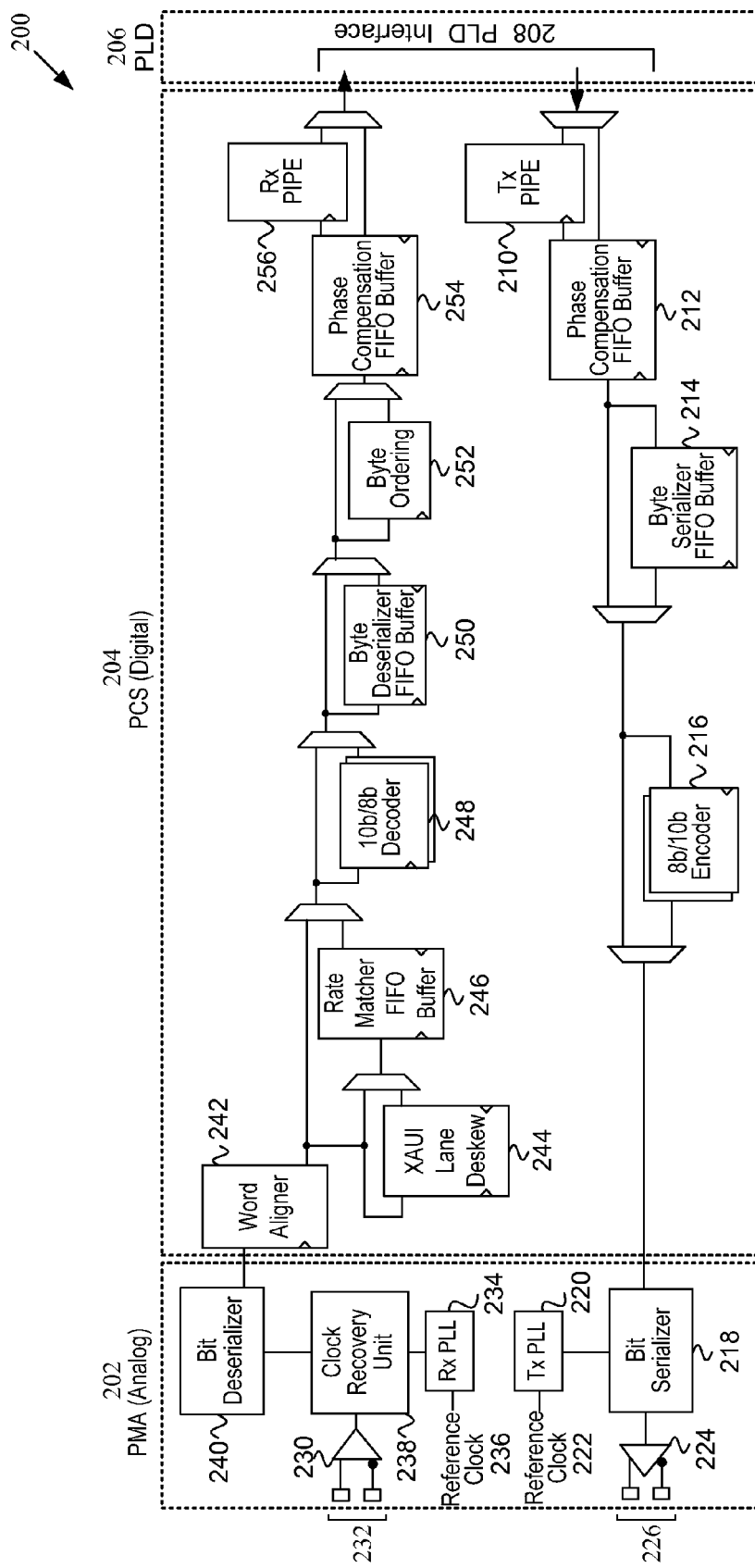
FIG. 2 illustrates a block diagram of a transceiver according to various embodiments of the present invention.

FIG. 2 illustrates a block diagram 200 of a Stratix II GX transceiver, which is available from Altera Corporation of San Jose, Calif. A detailed description of the Stratix II GX transceiver can be found in the Stratix II GX Device Handbook, Vol. I, SIIGX5V1-2.2, April 2006, and in the Stratix II GX Device Handbook, Vol. II, SIIGX5V2-3.1, April 2006, which are hereby incorporated by reference. In general, the Stratix II GX transceiver provides dedicated circuitry to implement standard protocols operating between 622 Mbps and 6.375 Gbps in native mode. The transceiver is also capable of supporting data rates as low as 270 Mbps using oversampling, which is important when supporting legacy protocols and protocols with multiple data rates. The transceiver implements key building blocks for a number of protocols including PCI Express, Gigabit Ethernet, SDI, Altera's SerialLite II, XAUI, Serial RapidIO and OIF CEI-6G, which when augmented with other system components provide a complete and low risk path solution.

Stratix II GX transceivers are structured into duplex four-channel groups called transceiver blocks. Each channel within a transceiver block can be configured in either single width or double-width mode. Single-width mode has an 8-bit/10-bit SERDES data path through the transceiver and supports data rates from 622 Mbps to 3.125 Gbps. Double-width mode has a 16-bit/20-bit SERDES data path through the transceiver and supports data rates from 3.125 Gbps to 6.375 Gbps. A Stratix II GX transceiver includes an analog portion PMA 202 and a digital portion PCS 204, which is operable to interface with programmable logic device (PLD) logic 206 via PLD interface 208.

To further elaborate, the Stratix II GX transmitter includes the following modules/blocks: transmitter PIPE interface 210; Phase Compensation FIFO Buffer 212; byte serializer 214; encoder 216; serializer 218; transmitter PLL 220; differential output buffers 224. It will be appreciated by those skilled in the art that some of the transmitter components are optional and can be omitted or bypassed. A brief description about the various components within the transmitter block is provided in order from the PLD interface 208 to the transmitter buffer 224.

Transmitter PIPE interface 210 is operable to support the PCI Express protocol. The transmitter PIPE interface 210 simplifies and standardizes the interface to the PCI Express physical layer.

The transmitter data path includes a dedicated Phase Compensation FIFO Buffer 212 that decouples phase variations between the PLD and transceiver clock domains. This block is active in both single and double-width modes.

Byte serializer 214 allows the programmable logic device (PLD) to run at half the rate of the transmit data path to allow the PLD logic to easily meet timing. Without byte serializer 214, at the maximum data rate of 6.375 Gbps with a 20-bit serialization factor, the PLD runs at 318.75 MHz. With the byte serializer 214, the PLD runs at 159.375 MHz. This block is available in both single and double-width modes. In single-width mode, the PLD interface is either 16 or 20 bits when the byte serializer is used. In double-width mode, using the byte serializer creates a PLD interface of 32 bits or 40 bits, depending on the serialization factor.

Many protocols use 8B/10B encoding. Stratix II GX devices have two dedicated 8B/10B encoders 216 in each transmitter channel to support high data rates. This encoding technique ensures sufficient data transitions and a DC-balanced stream within the data signal for successful data recovery at the receiver. This block is available in the single- and double-width modes. In single-width mode, one of the 8B/10B encoders 216 is active. In double-width mode, both 8B/10B encoders 216 are active and operate in a cascade mode. The 8B/10B encoder follows the IEEE 802.3 1998 edition standard for 8B/10B encoding.

Serializer 218 converts the incoming lower speed parallel signal from the transceiver's physical coding sublayer (PCS) to a high-speed serial signal on the transmit side. Serializer 218 supports a variety of conversion factors, ensuring implementation flexibility. Serializer 218 also supports an 8- or 10-bit serialization factor in the single-width mode and a 16- or 20-bit serialization factor in double-width mode. Serializer block 218 also performs clock synthesis on the slow-speed clock for the parallel transmitter logic in the transceiver and for the PLD.

Each transceiver clock has two transmitter PLLs 220 that generate the required clock frequencies based upon the synthesis of an input reference clock 222. Input reference clock 222 can be modulated with jitter according to various aspects of the present invention. Each transmitter PLL 220 supports multiplication factors to allow the use of various input clock frequencies. Both transmitter PLLs 220 are identical and support data ranges from 622 Mbps to 6.375 Gbps. Each transmitter PLL 220 drives up to four channels in non-PIPE mode. In PIPE mode, only one transmitter PLL 220 is active and it drives up to eight channels.

Differential output buffers 224 support the 1.5-V PCML and 1.2-V PCML I/O standards and have a variety of features that improve system signal integrity. For example, a feature such as programmable pre-emphasis helps compensate for high frequency losses. Additionally, termination 226 provides the appropriate transmitter buffer termination for 100, 120, or 150Ω transmission lines. According to various embodiments of the present invention, the serial loopback circuit mentioned earlier connects to termination 226. Alternatively, the serial loopback circuit can connect to the output of serializer 218.

The Stratix II GX receiver includes the following modules/blocks: differential input buffers 230; receiver PLL 234;

clock recovery unit (CRU) 238; deserializer block 240; word aligner module 242; embedded channel aligner 244; rate matcher 246; decoder 248; byte deserializer 250; byte ordering block 252; phase compensation FIFO buffer 254; and receiver PIPE interface 256. It will be appreciated by those skilled in the art that some of the receiver components are optional and can be omitted or bypassed. A brief description about the various components within the receiver block is provided in order from the serial receiver buffer 230 to the parallel PLD interface 208.

Differential input buffers 230 support the 1.5-V PCML and 1.2-V PCML I/O standards, and have a variety of features that improve system signal integrity. Programmable equalization capabilities compensate for signal degradation across transmission mediums. Additionally, termination 232 provides the appropriate receiver termination for 100, 120, or 150Ω transmission lines. According to various embodiments of the present invention, the serial loopback circuit connects to termination 232. Alternatively, the serial loopback circuit can connect to the input of CRU 238.

Receiver PLL 234 ramps the voltage controlled oscillator (VCO) to the frequency of the reference clock 236. Once that occurs, CRU 238 controls the VCO. Each receiver channel in the transceiver has a dedicated receiver PLL 234 that provides clocking flexibility and supports a range of data rates. These PLLs 234 generate the required clock frequencies based upon the synthesis of an input reference clock 236. Input reference clock 236 can be modulated with jitter according to various aspects of the present invention. During serial loopback, PLL 234 first follows the reference clock and then switches over and follows the incoming data. The modulated jitter is embedded into the incoming data. Generally, the receiver PLL reference clock can be modulated, but the VCO will not track it. It should be noted that reference clocks 222 and 236 could be set to a common frequency value or to different frequency values.

CRU 238 performs analog clock data recovery (CDR). CRU 238 recovers the embedded clock in the data stream to properly clock the incoming data. The recovered clock also clocks the reset of the receiver logic clock and is available in the PLD fabric.

Deserializer block 240 converts the incoming data stream from a high-speed serial signal to a lower speed parallel signal that can be processed in the PLD logic array on the receive side. Deserializer 240 supports a variety of conversion factors, ensuring implementation flexibility. Deserializer 240 supports an 8- or 10-bit deserialization factor in the single-width mode and a 16- or 20-bit deserialization factor in double-width mode. Deserializer block 240 also performs clock synthesis on the slow-speed clock from the CRU 238 and forwards the recovered clock to the parallel receiver logic in the transceiver and for the PLD.

Word aligner module 242 contains a fully programmable pattern detector to identify specific patterns within the incoming data stream. The pattern detector includes recognition support for control code groups for 8B/10B encoded data and A1A2 or A1A1A2A2-type frame alignment patterns for scrambled data. Custom alignment patterns are also possible. Word aligner 242 can be bypassed in some functional modes.

An embedded channel aligner 244 aligns byte boundaries across multiple channels and synchronizes the data entering the logic array from the transceiver block's four channels. The Stratix II GX channel aligner 244 is optimized for a 10-Giagbit Ethernet XAUI four-channel implementation. The channel aligner 244 includes the control circuitry and channel alignment character detection defined by the 10-Gigabit Attachment Unit Interface (XAUI) protocol.

In certain systems, the clock frequencies of the transmitting and receiving device often do not match. This mismatch can cause the data to transmit at a rate slightly faster or slower than the receiving device can interpret. The Stratix II GX rate matcher 246 resolves the frequency differences between the recovered clock and the PLD logic array clock by inserting or deleting removable characters from the data stream, as defined by the transmission protocol, without compromising transmitted data.

Various protocols use 8B/10B decoding. Stratix II GX devices have two dedicated 8B/10B decoders 248 in each channel to support high data rates. This decoding technique ensures fast disparity and code group error detection. This block is available in the single- and double-width modes. In single-width mode, one of the 8B/10B decoders 248 is active. In double-width mode, both 8B/10B decoders 248 are active and operate in a cascade mode. The 8B/10B decoder 248 follows the IEEE 802.3 1998 edition standard for 8B/10B decoding.

Byte deserializer 250 widens the transceiver data path before the PLD interface to reduce the rate at which the received data must be clocked in the PLD logic. Byte deserializer block 250 is available in both single and double-width modes. In single-width mode, the PLD interface 208 is either 16 or 20 bits when used. In double-width mode, using the byte deserializer 250 creates a PLD interface 208 of 32 or 40 bits, depending on the serialization factor.

Each receiver has an optional byte ordering block 252 that is available in some functional modes when the byte deserializer 250 is used. This block restores the expected word ordering if the byte deserialization of the data word does not match the expected word ordering after the byte deserializer block 250. Byte ordering block 252 is not available when the rate matcher 246 is used because rate matcher 246 may alter the byte order by adding or deleting bytes.

Each receiver data path has a dedicated phase compensation FIFO buffer 254 that decouples phase variations between the PLD and transceiver clock domains.

A receiver PIPE interface 256 supports the PCI Express protocol. The receiver PIPE interface simplifies and standardizes the back-end interface to the PCI Express physical layer.

Figure 3:
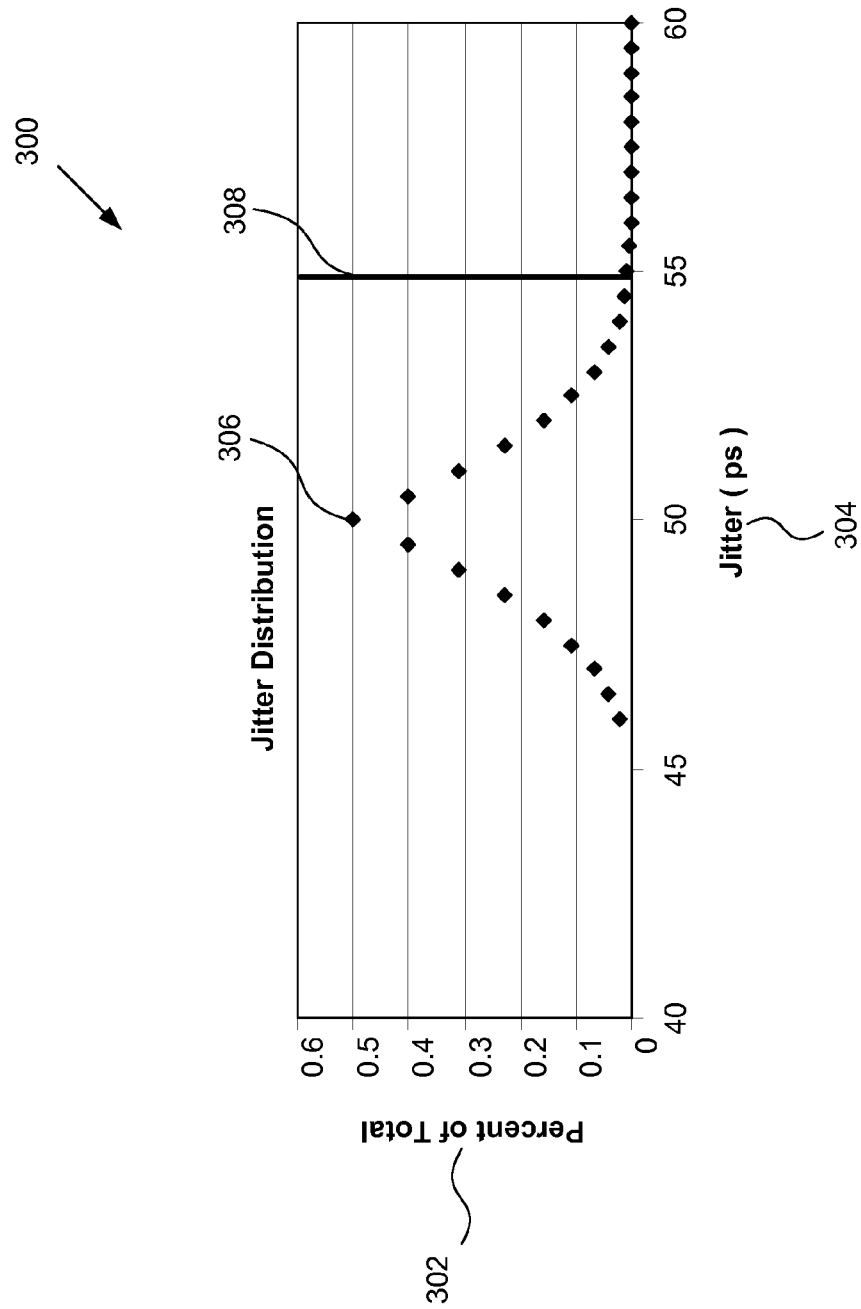
FIG. 3 illustrates a graph of jitter distribution among tested transceivers according to various embodiments of the present invention.

The primary disadvantage of the conventional loopback technique is that the jitter of the link is not tested. A non-compliant link can still pass a conventional serial loopback test. Accordingly, aspects of the present invention provide jitter coverage for both the receiver and the transmitter PLLs while maintaining the cost and scaling advantages of a conventional serial loopback test. Units with failing jitter values can be rejected at final test. To further elaborate, FIG. 3 illustrates a graph of jitter distribution among tested transceivers according to various embodiments of the present invention. The graph is a mapping between percent of total tested transceivers 302 (in %) and jitter amount 304 (in picoseconds). In this case, jitter mean 306 is 50 ps while the specification threshold 308 (e.g., allowable jitter reference) is at 55 ps. A conventional serial loopback test will pass the units to the right of the specification threshold 308.

The mechanisms and techniques of the present invention allow a tester to better screen out the bad units to the right of the specification threshold 308. In general, the transmitter reference clock is jittered at a frequency below the bandwidth of the transmitter PLL but above the bandwidth of the receiver PLL. It will be appreciated by those skilled in the art that this is the opposite bandwidth relation of what is desired by users for link integrity.

Techniques for Testing a Transceiver

Figure 4:
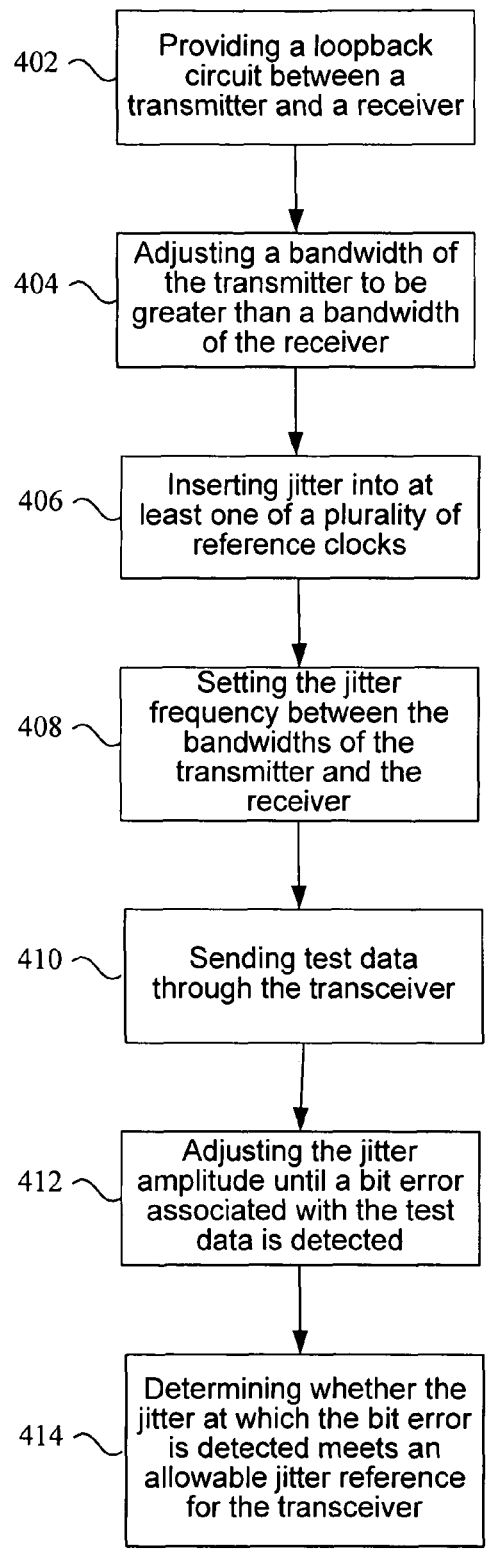
FIG. 4 is a flow process diagram for testing a transceiver according to various embodiments of the present invention.

FIG. 4 is a flow process diagram for testing a transceiver according to various embodiments of the present invention.

Any suitable transceiver such as a serial transceiver may be tested. The transceiver may have any number of channels. As such, any number of channels can be tested according to the techniques of the present invention. According to a preferred embodiment, all the channels are tested simultaneously.

At 402, a loopback circuit is provided between a transmitter and a receiver of a transceiver. Generally, the loopback circuit allows data to directly transfer between the transmitter and the receiver. The loopback circuit can be either internal or external to the transceiver. At one end of the loopback circuit, connections are made to the output(s) of the transmitter. At the opposite end of the loopback circuit, connections are made to corresponding input(s) of the receiver.

At 404, a bandwidth of the transmitter is adjusted to be greater than a bandwidth of the receiver. According to a specific embodiment, the bandwidth of the transmitter PLL is set greater than the bandwidth of the receiver PLL. For example, the bandwidth of the transmitter PLL is set at 30 MHz whereas the bandwidth of the receiver PLL is set at 10 MHz. It is important to note that the relationship between the transmitter and receiver settings is opposite to what is conventionally used for maintaining link integrity of a transceiver. That is, for in the field operation, the bandwidth of the transmitter PLL can be set lower than the bandwidth of the receiver PLL. However, for testing purposes, the bandwidth of the transmitter PLL is set higher than the bandwidth of the receiver PLL.

At 406, jitter is inserted into at least one of the multiple reference clocks associated with the transceiver. Any mechanism that simulates random jitter or deterministic jitter or both is referred to herein as jitter. For example, jitter includes a modulation signal with corresponding modulation frequency and modulation amplitude. In other words, jitter has a corresponding jitter frequency and jitter amplitude. Reference clocks include a transmitter PLL reference clock and a receiver PLL reference clock. According to one embodiment, the frequencies of the reference clocks are set to a common value. For example, the reference clocks are set to 166 MHz.

At 408, the jitter frequency is set between the bandwidths of the transmitter and the receiver. According to a specific embodiment, the jitter frequency is set at a value below that of the bandwidth of the transmitter PLL but above that of the bandwidth of the receiver PLL. Therefore, if the bandwidth of the transmitter PLL is set at 30 MHz whereas the bandwidth of the receiver PLL is set at 10 MHz, then the jitter frequency can be set at 20 MHz. Further, if the reference clocks were set to 166 Mz, the 166 MHz reference clocks are now modulated with jitter set at 20 MHz. A purpose of setting the jitter frequency in the specified range between the bandwidths of the transmitter and the receiver is so that the receiver is unable to follow the reference clocks, thereby causing the corresponding eye diagram to close when sending data through the transceiver. As will be discussed further below in FIGS. 5 and 6, eye diagrams are used to monitor the timing budget of a transceiver.

At 410, test data is sent through the transceiver. According to various embodiments, test data is sent from a pattern generator to a pattern verifier via the transmitter, loopback circuit, and receiver. Any suitable pattern generator and pattern verifier may be used to send and receive the test data. For example, pattern generator and pattern verifier can be any conventional clock/pulse generator and verifier.

At 412, the jitter amplitude is adjusted (e.g., increased or decreased) until a bit error associated with the test data is detected. Adjusting the jitter amplitude causes the corresponding eye diagram to change. Generally, a bit error associated with the test data is detected when the eye diagram is substantially closed. According to one embodiment, the bit error is detected at the pattern verifier. It is important to note that operations 406, 408, and 412 are used to modulate a reference clock with jitter.

At 414, determining whether the jitter at which the bit error is detected meets an allowable jitter reference for the transceiver is performed. The jitter at which the bit error is detected can be measured using any conventional mechanism or technique. Any suitable criterion may also be used for making the determination. For instance, the operation of determining may include comparing the jitter amplitude at which the bit error is detected to the allowable jitter reference for the transceiver. Further, the allowable jitter reference for the transceiver is met when the jitter (e.g., inserted jitter of 406) is equal to or above the allowable jitter reference. Alternatively, the allowable jitter reference for the transceiver is not met when the jitter is less than the allowable jitter reference. For example, suppose an allowable jitter reference is a XAUI specification of 0.70 UI, then a jitter amplitude of 0.75 UI would meet the allowable jitter reference for the transceiver; thereby, indicating a good transceiver unit and passing the transceiver test. On the other hand, a jitter amplitude of 0.55 UI would fail to meet the allowable jitter reference; thereby, indicating a bad transceiver unit and failing the transceiver test.

Eye Diagrams

Figure 5:
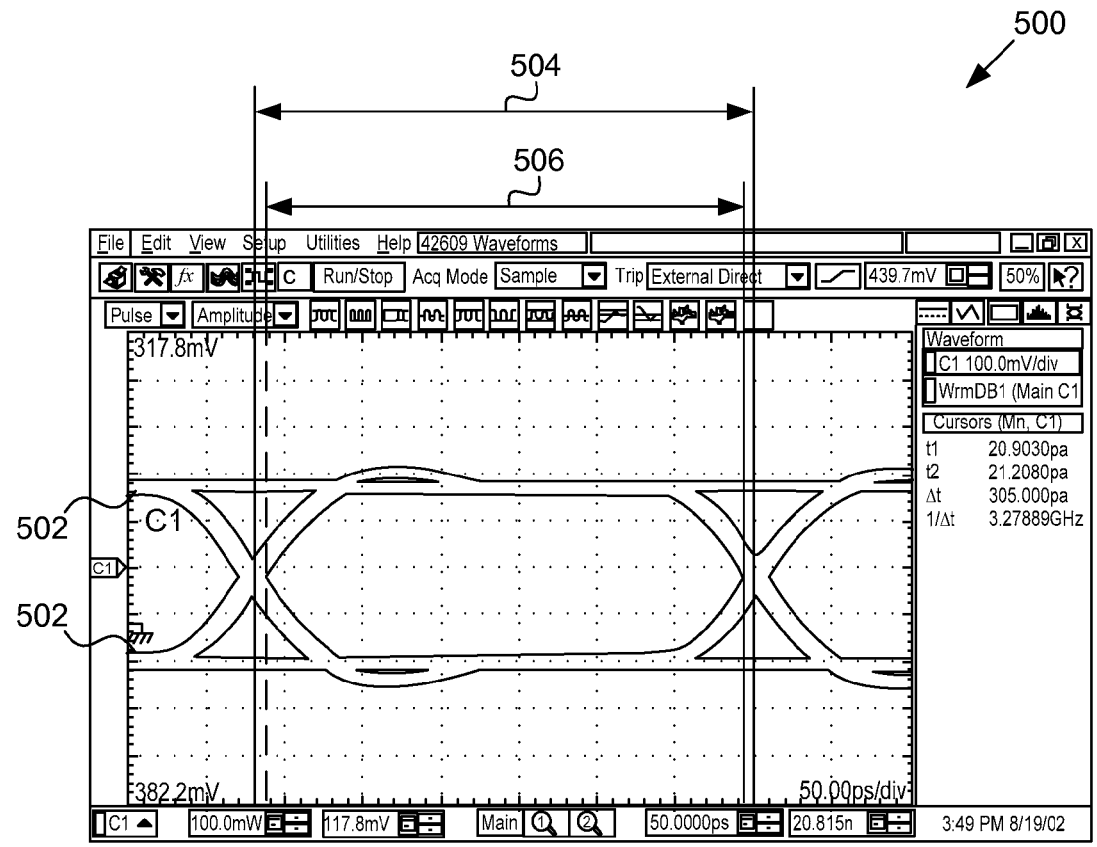
FIG. 5 illustrates a substantially open eye diagram according to various embodiments of the present invention.
Figure 6:
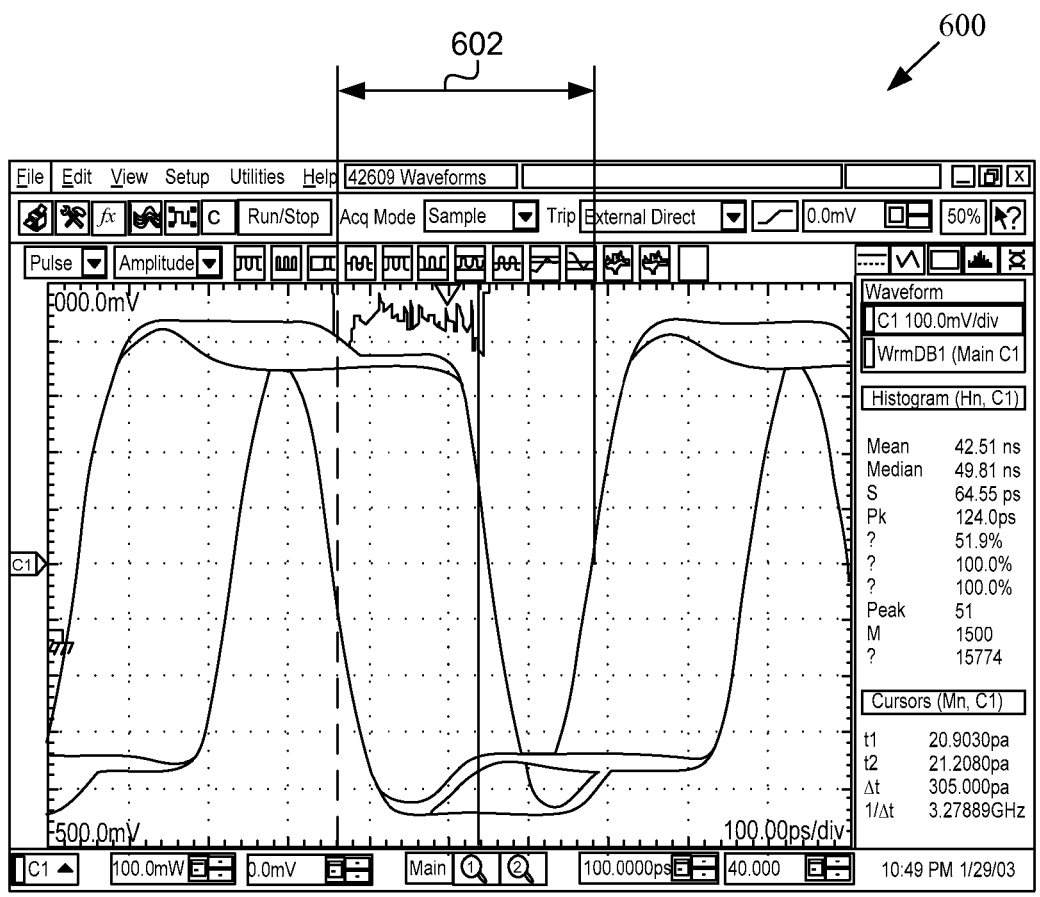
FIG. 6 illustrates a substantially closed eye diagram according to various embodiments of the present invention.

To further understand the various aspects of the present invention, three cases will be described with references to FIGS. 5 and 6. FIG. 5 illustrates a substantially open (clean) eye diagram 500 according to various embodiments of the present invention whereas FIG. 6 illustrates a substantially closed eye diagram according to various embodiments of the present invention.

In case 1, no reference clock jitter is introduced. The receiver's recovered clock relative to the data 502 is shown in FIG. 5. A measurement of jitter is the difference between the bit time 504 and the data eye width 506. If the timing margin is greater than 0.9 UI (i.e., 90% of the bit period is open space in the eye diagram), then the link will pass if Tx jitter+Rx jitter<0.9 UI. However, this is unacceptably large jitter in some cases. For example, XAUI only allows a total jitter generation between the transmitter and the receiver of 0.7 UI. That is, a link will only pass if Tx jitter+Rx jitter<0.7 UI.

In case 2, the reference clock jitter<bandwidth of the receiver. The receiver's recovered clock relative to the data is relatively the same as that shown in FIG. 5. This is because the receiver's recovered clock tracks the data and hence the eye is clean (i.e., open).

In case 3, the reference clock jitter>bandwidth of the receiver. The receiver's recovered clock relative to the data is shown in FIG. 6. A unit interval 602 is also shown in FIG. 6. In this case, the receiver's recovered clock is unable to track the data and hence the timing margin is reduced and substantially closed (as compared to the eye diagram in FIG. 5). For example, if the timing margin is reduced by approximately 0.6 UI, the link would fail if Tx jitter+Rx jitter>0.4 UI. However, a unit which passes case 3 would be guaranteed XAUI compliant as the total Rx jitter+Tx jitter of 0.4 UI is less than the XAUI specification of 0.7 UI.

Jitter Transfer Curves

Figure 7:
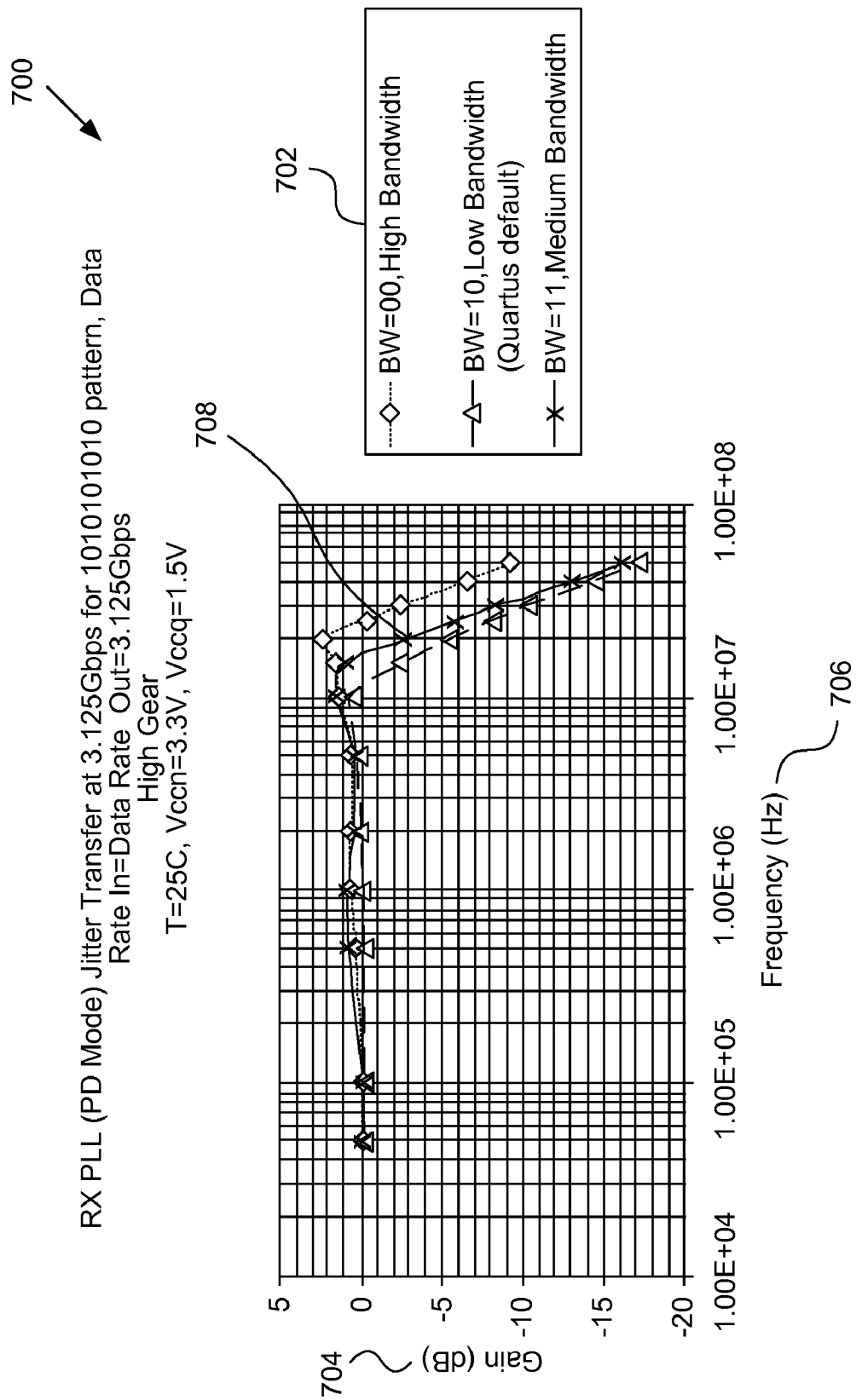
FIG. 7 illustrates a graph of jitter transfer curves for a receiver PLL according to a transceiver design for good link integrity.

To understand the inverse relationship of the reference clock settings implemented in the present invention, graphs of jitter transfer curves are provided. FIG. 7 illustrates a graph 700 of jitter transfer curves for a receiver PLL according to a transceiver design for good link integrity whereas FIG. 8 illustrates a graph 800 of jitter transfer curves for a transmitter PLL according to a transceiver design for good link integrity.

Figure 8:
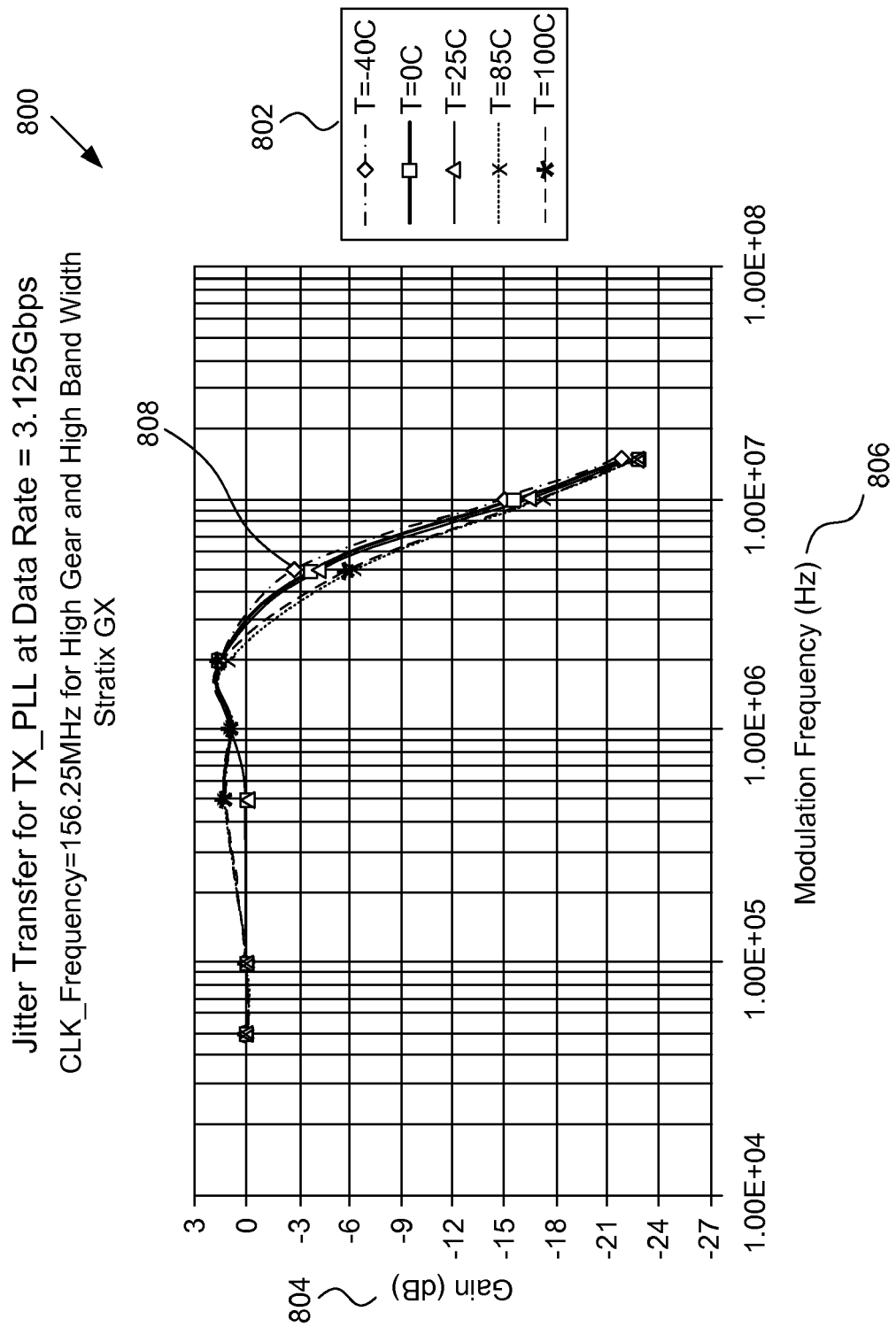
FIG. 8 illustrates a graph of jitter transfer curves for a transmitter PLL according to a transceiver design for good link integrity.

Referring to FIGS. 7 and 8, graphs 700 and 800 respectively show the jitter transfer for Rx PLL and Tx PLL at data rate 3.125 Gbps. Corresponding jitter transfer curves (see legends 702 and 802) are mapped in graphs 700 and 800 according to their gains (dB) 704/804 and frequencies (Hz) 706/806. At −3 dB, the Rx PLL bandwidth 708 is about 20 MHz whereas the Tx bandwidth 808 is about 5 MHz. Therefore, the Rx PLL bandwidth is greater than the Tx PLL bandwidth, which is in accordance to good transceiver design for link integrity during field operating conditions. However for testing transceivers in accordance to the present invention, implementing DFT features which enable the opposite bandwidth relationship is desired. That is, the Rx PLL bandwidth should be set lower than the Tx PLL bandwidth.

Programmable Chip Example

The techniques and mechanisms of the present invention are applicable to integrated circuits that support programmability. However, it should be noted that these techniques are generally applicable to all transceivers and not just programmable transceivers. Integrated circuits that are programmable by a user to produce a custom design include programmable logic devices (PLDs). Programmable logic devices refer to any integrated circuit that may be programmed to perform a desired function and include programmable logic arrays (PLAs), programmable array logic (PAL), field programmable gate arrays (FPGA), complex programmable logic devices (CPLDs), and a wide variety of other logic and memory devices that may be programmed. Some application specific integrated circuits (ASICs) also support some degree of programmability. Often, such PLDs are designed and programmed by a design engineer using an electronic design automation tool that takes the form of a software package.

Figure 9:
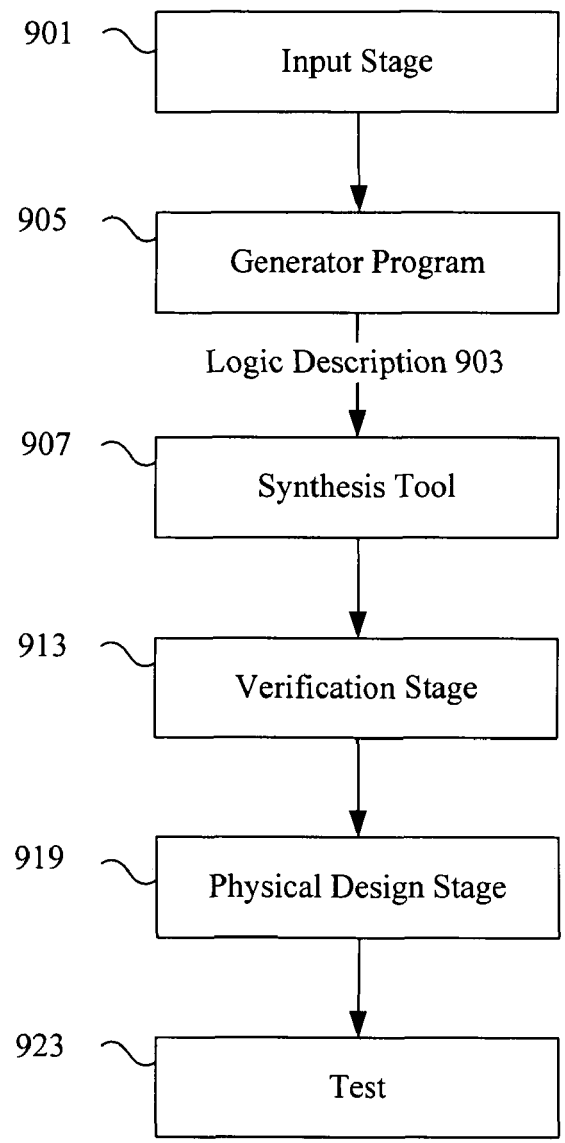
FIG. 9 is a flow process diagram showing a technique for implementing a system on a programmable chip.

FIG. 9 is a flow process diagram showing a technique for implementing a system on a programmable chip. An input stage 901 receives selection information typically from a user for logic such as a processor core as well as other components of system 100 such as a test controller, memory, pattern generator, pattern verifier, or transceiver to be implemented on an electronic device. In one example, the input received is in the form of a high-level language program. A generator program 905 creates a logic description and provides the logic description along with other customized logic to any of a variety of synthesis tools, place and route programs, and logic configuration tools to allow a logic description 903 to be implemented on an electronic device. In some examples, the programmable chip may include hard-coded components such as a hard-coded transceiver. The Stratix GX device available from Altera Corporation of San Jose, Calif. is an example of a programmable chip that may have a hard-coded transceiver.

In one example, an input stage 901 often allows selection and parameterization of component modules to be used on an electronic device. In some examples, components provided to an input stage include intellectual property functions, megafunctions, and intellectual property cores. The input stage 901 may be a graphical user interface using wizards for allowing efficient or convenient entry of information. The input stage may also be a text interface or a program reading a data file such as a spreadsheet, database table, or schematic to acquire selection information. The input stage 901 produces an output containing information about the various modules selected.

In typical implementations, the generator program 905 can identify the selections and generate a logic description with information for implementing the various modules. The generator program 905 can be a Perl script creating HDL files such as Verilog, Abel, VHDL, and AHDL files from the module information entered by a user. In one example, the generator program identifies a portion of a high-level language program to accelerate. The other code is left for execution on a processor core.

According to various embodiments, the generator program 905 identifies pointers and provides ports for each pointer. One tool with generator program capabilities is System on a Programmable Chip (SOPC) Builder available from Altera Corporation of San Jose, Calif. The generator program 905 also provides information to a synthesis tool 907 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 901, generator program 905, and synthesis tool 907 can be separate programs. The interface between the separate programs can be a database file, a log, or simply messages transmitted between the programs. For example, instead of writing a file to storage, the input stage 901 can send messages directly to the generator program 905 to allow the generator program to create a logic description. Similarly, the generator program can provide information directly to the synthesis tool instead of writing HDL files. Similarly, input stage 901, generator program 905, and synthesis tool 907 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 907. Various synthesized netlist formats will be appreciated by one of skill in the art.

A verification stage 913 typically follows the synthesis stage 907. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 913, the synthesized netlist file can be provided to physical design tools 919 including place and route and configuration tools. A place and route tool typically locates logic cells on specific logic elements of a target hardware device and connects wires between the inputs and outputs of the various logic elements in accordance with logic required to implement an electronic design. The device can also be physically tested at 923.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif.

As noted above, different stages and programs can be integrated in a variety of manners. According to one embodiment, the input stage 901, the generator program 905, the synthesis tool 907, the verification tools 913, and physical design tools 919 are integrated into a single program. The various stages are automatically run and transparent to a user. The program can receive the user-selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 10:
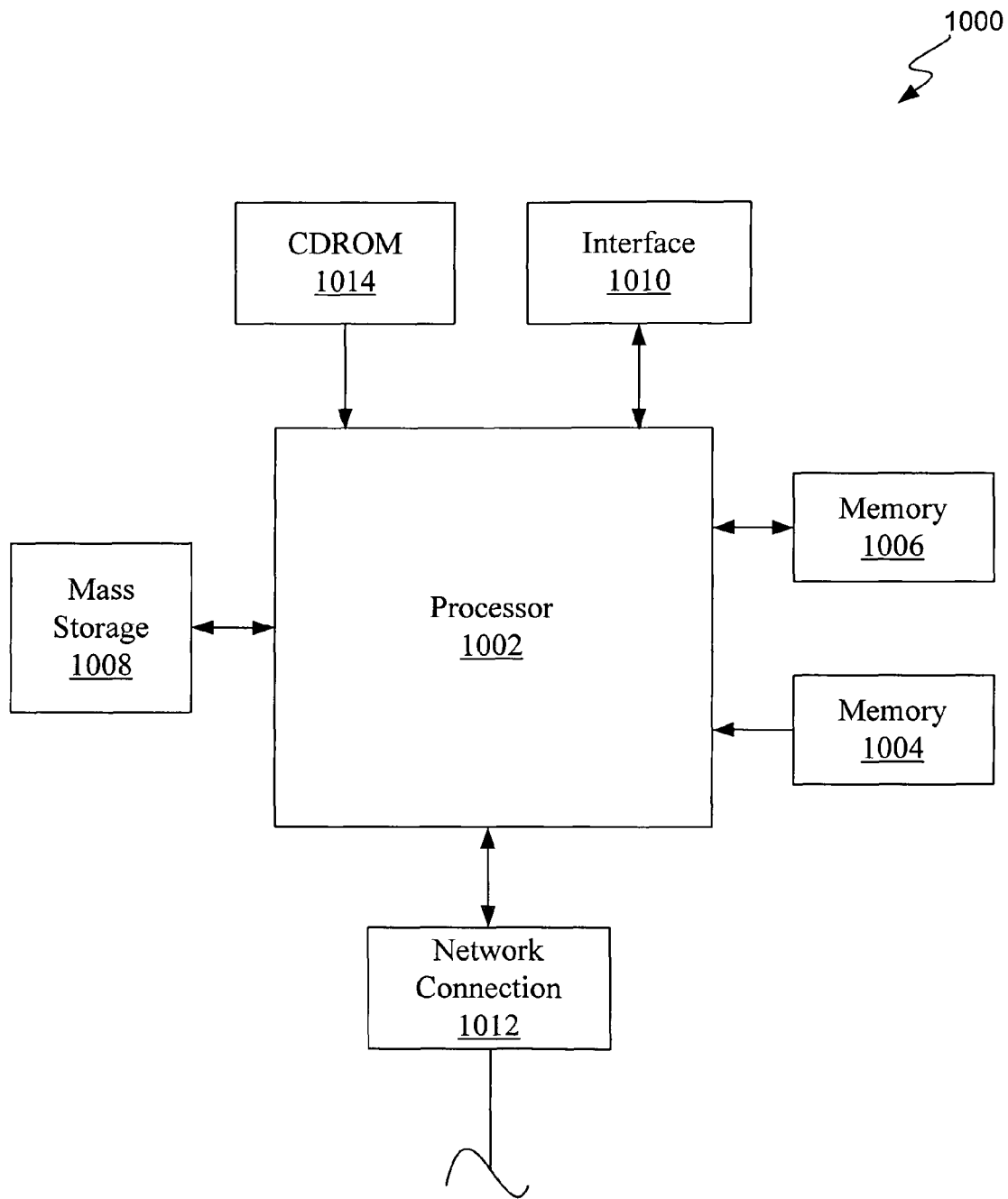
FIG. 10 is a block diagram of a computer system.

FIG. 10 illustrates a typical computer system that can be used to implement a programmable chip having components such as a transceiver and mechanisms for testing the transceiver. The computer system 1000 includes any number of processors 1002 (also referred to as central processing units, or CPUs) that are coupled to devices including memory 1006 (typically a random access memory, or "RAM"), memory 1004 (typically a read only memory, or "ROM"). The processors 1002 can be configured to generate a test sequences for any designated processor. As is well known in the art, memory 1004 acts to transfer data and instructions uni-directionally to the CPU and memory 1006 is used typically to transfer data and instructions in a bi-directional manner.

Both of these memory devices may include any suitable type of the computer-readable media described above. A mass storage device 1008 is also coupled bi-directionally to CPU 1002 and provides additional data storage capacity and may include any of the computer-readable media described above. The mass storage device 1008 may be used to store programs, data and the like and is typically a secondary storage medium such as a hard disk that is slower than memory. The mass storage device 1008 can be used to hold a library or database of prepackaged logic or intellectual property functions, as well as information on generating particular configurations. It will be appreciated that the information retained within the mass storage device 1008, may, in appropriate cases, be incorporated in standard fashion as part of memory 1006 as virtual memory. A specific mass storage device such as a CD-ROM 1014 may also pass data uni-directionally to the CPU.

CPU 1002 is also coupled to an interface 1010 that includes one or more input/output devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1002 optionally may be coupled to a computer or telecommunications network using a network connection as shown generally at 1012. With such a network connection, it is contemplated that the CPU might receive information from the network, or might output information to the network in the course of performing the above-described method steps. It should be noted that the system 1000 may also be associated with devices for transferring completed designs onto a programmable chip. The above-described devices and materials will be familiar to those of skill in the computer hardware and software arts.

The hardware elements described above may be configured to act as multiple software modules for performing the operations of this invention. For example, instructions for running a generator program, input stage (e.g., a wizard), and/or compiler may be stored on mass storage device 1008 or 1014 and executed on CPU 1002 in conjunction with primary memory 1006.

While the invention has been particularly shown and described with reference to specific embodiments thereof, it will be understood by those skilled in the art that changes in the form and details of the disclosed embodiments may be made without departing from the spirit or scope of the invention. For example, many of the components may be modified or rearranged for use with a receiver, transmitter, or transceiver. It is therefore intended that the invention be interpreted to include all variations and equivalents that fall within the true spirit and scope of the present invention.

We claim:

1. A method for testing a transceiver having a transmitter and a receiver, the method comprising:
   providing a loopback circuit between the transmitter and the receiver, the transmitter and receiver having associated bandwidths and transmitter phase lock loop (PLL) and receiver PLL_reference clocks with corresponding frequencies;
   adjusting the bandwidth of the transmitter to be greater than the bandwidth of the receiver;
   setting jitter frequency between the bandwidth of the transmitter and the receiver;
   modulating at least one of the reference clocks with the jitter until a bit error associated with test data is detected after sending the test data through the transceiver; and
   determining whether the jitter at which the bit error is detected meets an allowable jitter reference for the transceiver.

2. The method of claim 1, wherein the jitter has a corresponding frequency and amplitude, wherein the operation of modulating includes:
   adjusting the jitter amplitude until the bit error is detected.

3. The method of claim 2, wherein the operation of modulating further includes:
   setting the jitter frequency between the bandwidths of the transmitter and the receiver for disallowing the receiver form tracking the receiver PLL reference clock.

4. The method of claim 1, wherein sending the test data through the transceiver includes:
   sending test data from a pattern generator to a pattern verifier via the transmitter, loopback circuit, and receiver.

5. The method of claim 4, wherein the bit error is detected at the pattern verifier.

6. The method of claim 1, wherein the operation of determining includes:
   comparing the jitter at which the bit error is detected to the allowable jitter reference for the transceiver, wherein the allowable jitter reference for the transceiver is met when the jitter is equal or above the allowable jitter reference.

7. The method of claim 1, wherein the transceiver is a serial transceiver.

8. The method of claim 1, wherein the jitter simulates random jitter or deterministic jitter or both.

9. The method of claim 1, further comprising:
setting the frequencies of the reference clocks to a common value.

10. The method of claim 1, wherein the transceiver is implemented on a programmable chip.

11. An integrated circuit for testing a transceiver having a transmitter and a receiver, the integrated circuit comprising:
a pattern generator operable to output test data for sending through the transceiver;
a pattern verifier operable to receive test data sent through the transceiver; and
a test controller operable to verify that a serial loopback circuit exists between the transmitter and the receiver, adjust a bandwidth of the transmitter to be greater than a bandwidth of the receiver, set jitter frequency between the bandwidth of the transmitter and the receiver; modulate at least one of a transmitter PLL reference clock and the receiver PLL reference docks clock with the jitter until a bit error associated with the test data is detected, and determine whether the jitter at which the bit error is detected meets an allowable jitter reference.

12. The integrated circuit of claim 11, further includes:
the transceiver.

13. The integrated circuit of claim 12, further includes:
the loopback circuit.

14. The integrated circuit of claim 11, wherein the test controller is operable to adjust a jitter amplitude until the bit error is detected.

15. The integrated circuit of claim 14, wherein the test controller is operable to set a jitter frequency between the bandwidths of the transmitter and the receiver for disallowing the receiver from tracking a receiver phase lock loop (PLL) reference clock.

16. The integrated circuit of claim 11, wherein the test controller is operable to compare the jitter at which the bit error is detected to the allowable jitter reference for the transceiver, wherein the allowable jitter reference for the transceiver is met when the jitter is equal or above the allowable jitter reference.

17. A method for testing a transceiver having a transmitter and a receiver, the method comprising:
establishing a loopback circuit between the transmitter and the receiver, the transmitter and receiver having associated bandwidths and reference clocks with corresponding frequencies;
adjusting the bandwidth of the transmitter to be greater than the bandwidth of the receiver;
inserting jitter into at least one of the reference clocks, wherein the jitter has a corresponding frequency and amplitude;
setting the jitter frequency between the bandwidths of the transmitter and the receiver;
sending test data through the transceiver;
adjusting the jitter amplitude until a bit error associated with the test data is detected; and
determining whether the jitter at which the bit error is detected meets an allowable jitter reference for the transceiver.

18. The method of claim 17, wherein the reference clocks is selected from the group consisting of a transmitter PLL reference clock and a receiver PLL reference clock.

19. The method of claim 18, wherein all channels of the transceiver are tested simultaneously.

* * * * *